(No Model.)

N. C. MOFFETT.
PILLOW SHAM HOLDER.

No. 403,360. Patented May 14, 1889.

WITNESSES
C. S. Champion.
F. B. Keifer.

INVENTOR
Norman C. Moffett
By R. S. Dyrenforth
his Attorney

UNITED STATES PATENT OFFICE.

NORMAN CRANDALL MOFFETT, OF CLINTON, IOWA.

PILLOW-SHAM HOLDER.

SPECIFICATION forming part of Letters Patent No. 403,360, dated May 14, 1889.

Application filed June 25, 1888. Serial No. 278,204. (No model.)

*To all whom it may concern:*

Be it known that I, NORMAN CRANDALL MOFFETT, a citizen of the United States, residing at Clinton, in the county of Clinton and State of Iowa, have invented a new and useful Improvement in Pillow-Sham Holders, of which the following is a specification, reference being had to the accompanying drawings, in which—

Figure 1:
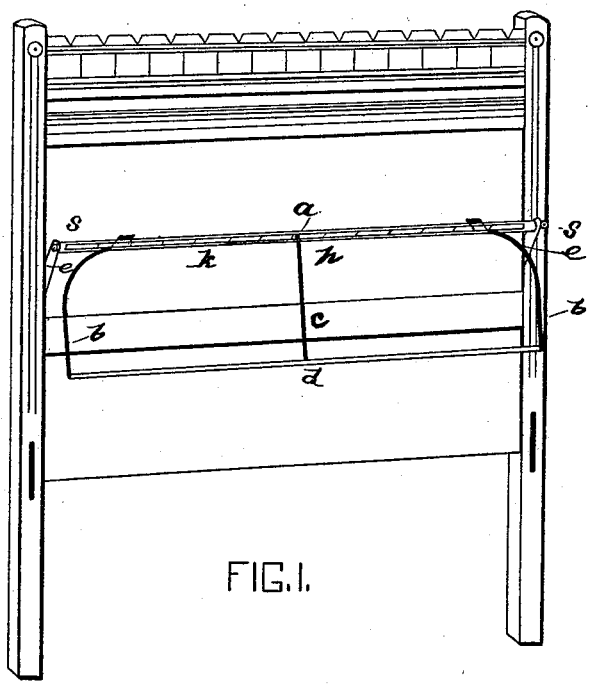
Figure 2:
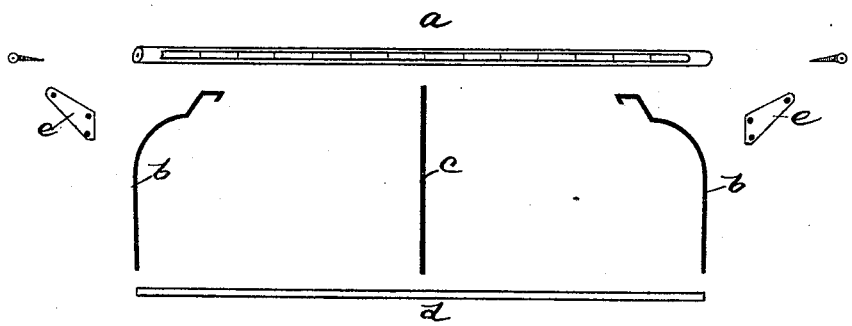

Figure 1 is a perspective view showing the pillow-sham holder complete, attached and ready for use. Fig. 2 is a detailed view showing the several parts disconnected.

Similar letters refer to similar parts throughout the several views.

In Fig. 1 is shown a horizontal bar or rod, $a$, to the ends of which are attached two flexible and elastic brackets or ears, $e\ e$, by means of two screw-eyes, $s\ s$, which pass through the brackets into the ends of the bar. The pressure upon the brackets $e\ e$ between the screw-eyes $s\ s$ and the ends of the bar $a$ when brought together holds the frame $a\ b\ b\ c\ d$ at any desired angle, rendering it self-supporting.

$b\ b$ are two corresponding arms, which pass through the bar $a$ diagonally or at right angles and return, the arms being so conformed to the bar as to hold them securely in position and to give sufficient traction for the support of the tape $d$. These arms are preferably secured to the bar $a$, as shown in detail in Fig. 2—viz., by passing the end of each arm through the bar $a$, flattening a portion of the end along the end of bar $a$, and making a return-hook into the bar. This return-hook is made, as shown, by crooking the tip of the arm $b$.

$c$ is a rod depending from the bar $a$ at its center.

$d$ is a tape attached to and connecting the arms $b\ b$ and supported in its center by the rod $c$, and sustains the shams when elevated.

$k\ k$ is a tape tacked to the face of the bar $a$, to which the shams are suspended.

The flexible brackets $e\ e$, which are attached to the bed-posts and support the bar $a$, render a sliding adjustable bar unnecessary, as the brackets can be bent to conform to different widths of beds, as may be required.

Having thus described my invention, what I claim, and desire to secure by Letters Patent, is—

The combination, with a pillow-sham holder consisting of the bar and frame attached thereto, of the elastic brackets flexible in the direction of the length of the bar and the screw-eyes passing through the elastic brackets and into the bar, whereby by the tightening of the screw-eyes the brackets are, through their resiliency, utilized to retain the holder in any desired position, substantially as described.

NORMAN CRANDALL MOFFETT.

Witnesses:
F. M. HENRY,
A. D. SALLEE.